Feb. 12, 1963  H. L. McPHERSON  3,077,322
ALTITUDE SENSING DEVICE FOR AIRCRAFT CONTROLS
Filed March 7, 1960  2 Sheets-Sheet 1

INVENTOR.
Harry L. McPherson
BY Weatherford & Weatherford
Attys

Feb. 12, 1963 H. L. McPHERSON 3,077,322
ALTITUDE SENSING DEVICE FOR AIRCRAFT CONTROLS
Filed March 7, 1960 2 Sheets-Sheet 2

INVENTOR.
Harry L. McPherson
BY
Weatherford & Weatherford
attys

United States Patent Office 3,077,322
Patented Feb. 12, 1963

3,077,322
ALTITUDE SENSING DEVICE FOR
AIRCRAFT CONTROLS
Harry L. McPherson, 1125 Poppen Drive,
Memphis, Tenn.
Filed Mar. 7, 1960, Ser. No. 13,375
9 Claims. (Cl. 244—78)

This invention relates to certain new and useful improvements in instrumentation for use in conjunction with aircraft controls, and particularly relates to a new and novel altitude sensing device for such aircraft controls.

There have heretofore been attempts to provide means for automatically adjusting aircraft controls, including means responsive to changes in altitude for effecting a correction in the altitude of aircraft so as to maintain substantially a desired level. These prior devices have in many instances been quite cumbersome, intricate and involved, presenting difficulties both of manufacture and of installation. Other devices have been attempted which have been comercially unsatisfactory because of a lack of sensitivity and accuracy of operation.

The present invention presents a relatively simple, yet highly sensitive and efficient device, which is characterized by its ease of manufacture and simplicity of installation, and which has proven highly satisfactory operationally.

The principal object of the present invention is to provide a new and novel altitude sensing device for aircraft controls.

A further object of the invention is to provide in such a sensing device an aneroid element coupled with an elongated tension spring in which the tension exerted on the head of the aneroid element may be conveniently varied to balance the aneroid at a selected altitude.

A further object of the invention is to provide such a device in which a counterbalanced rocker is coupled at one end to the aneroid head, and carries at its other end a sensing element.

A further object of the invention is to provide such a device in which the sensing element is a variable condenser.

A further object of the invention is to provide such a device in which the sensing element is a shiftable air valve.

A further object of the invention is to provide an interconnection between the rocker and the aneroid head adapted to prevent destructive overload on parts of the device.

A further object of the invention is to provide such an interconnection including a lost motion pin and slot arrangement; and A further object of the invention is generally to improve the design, construction and efficiency of means for manipulating aircraft controls.

The means by which the foregoing and other objects of the present invention are accomplished and the manner of their accomplishment will be readily understood from the following specification upon reference to the accompanying drawings, in which.

Figure 1:
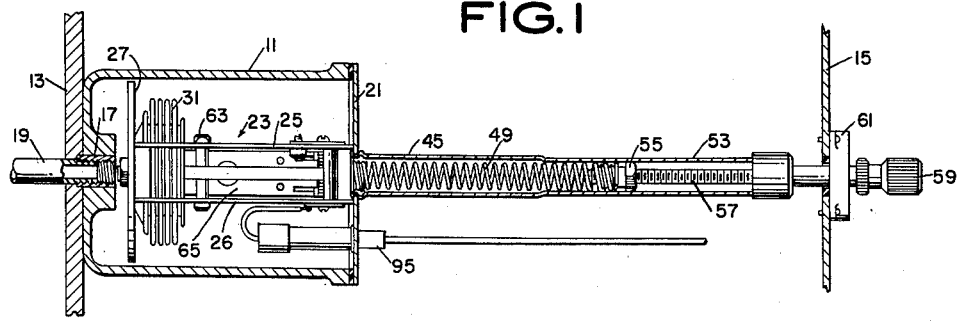
FIG. 1 is a fragmentary plan view, partly in section and partly in elevation, illustrating one embodiment of the present invention.

Referring now to the drawings in which the various parts are indicated by numerals, the device of the present invention includes a dome 11 which may be fixed in suitable manner to a part of the aircraft 13, as shown in FIG. 1, preferably forward of the instrument panel 15 of the aircraft. Dome 11 is apertured as at 17 to receive a tube 19 for suitable connection to the surrounding atmosphere. At its rearward end the open dome 11 is closed by a plate 21 to which are fixed, and from which are suspended, the operational mechanisms of the present invention.

Connected to and projecting forwardly from plate 21 is a chassis 23 comprising a pair of spaced apart plates 25, 26 connected to a forward disc 27. Mounted to disc 27 as by a suitable bolt 29 is an aneroid bellows 31 including an external bellows and an integrally connected cup-shaped head 33, head 33 being forwardly recessed and with the base of head 33 being spaced from the base of bellows 31. It will be observed that the head of bolt 29 projects into the space between head 33 and bellows 31 and provides an inner stop member for limiting the travel of head 33 relatively toward the base of the bellows.

Bellows 31 is positioned in cutouts 35 formed in chassis plates 25, 26, and it will be observed that plates 25, 26 are relatively closely spaced apart so that the bellows project laterally outwardly beyond the surfaces of the plates. The plates are, however, sufficiently spaced apart to provide for access to the interior of the recessed aneroid head 33.

Fixed to head 33 and projecting rearwardly therefrom are a pair of rods 37, which at their rearward ends include heads mounted in a bridge 39. Rods 37 are vertically spaced apart and at their forward ends extend into the recess of aneroid head 33. Bridge 39 is connected as by a suitable screw 41 to a head 43 which is shiftably contained in the forward end of a tube-like housing 45, tube 45 being fixed as at 47 to closure plate 21.

Within tube 45 a relatively elongated tension spring 49 is connected to head 43, and spring 49 extends forwardly throughout a substantial portion of the length of tube 45. It will be observed that tube 45 is relatively elongated, enabling the attachment of the present device through dome 11 to aircraft wall 13, and permitting the extension of the tube rearwardly to extend in adjacency to aircraft instrument panel 15 through which the means for manipulating the present device may be extended.

Intermediate the length of tube 45, it is preferably provided with a reduced section of polygonal cross section 53 within which is non-rotatably but slidably fixed a head 55 comprising a travelling head mounted upon and threadedly engaged with a rotatable threaded shaft 57. Head 55 is fixed to the rearward end of spring 49 and incremental shift of the head by rotation of threaded shaft 57 effects a corresponding adjustment in the tension on spring 49. Shaft 57 extends rearwardly through instrument panel 15 and is provided with a knurled knob 59 by which rotation of the shaft may be accomplished as desired, and the shaft further passes through a dial mechanism 61 which is preferably suitably geared (in a manner not shown) to the shaft in order to indicate the setting achieved by rotation of the knob and shaft.

Rockably mounted as upon pivot means 63 is a rocker 65. Pivot means 63 is connected to and carried by chassis plates 25, 26 and the pivot means is positioned intermediate aneroid head 33 and closure plate 21, being more distantly spaced from closure plate 21 than from aneroid head 33. Preferably rocker 65 is formed as from a channel member with an uppermost web and downwardly depending flanges. Rocker 65 is connected to aneroid head 33 by connection means adapted to insure the continued proper operation of the device.

Preferably a small tension spring 67 is coupled at its rear end as at 69 to rocker 65 and extends forwardly therefrom to a connection as at 71 to a tension strap 73 which extends forwardly passing over pivot means 63, and is connected as by a pin 75 to a block 76 fixed to aneroid head 33. Strap 73 is provided with an elongated slot 77 at its forward end through which pin 75 extends so that there is a lost motion connection between the strap and the aneroid head. Adjacent its rear end, strap 73 forward of its connection at 71 to spring 67 is provided with a similar elongated slot 78 which is slidably mounted upon a pin 79 carried by a fixture 81 extending downwardly from the web of rocker 65. Rocker 65 extends forwardly within the cup-like recess of the aneroid and into close proximity with aneroid head 33.

Within the aneroid recess a counterweight 83 is fixed to rocker 65, and for more sensitivity of counterweighting the counterweight 83 is preferably provided with a pair of downwardly projecting prongs 85 which are so bent as to project rearwardly beyond the recess of the aneroid device and to be enabled to extend downwardly therebeyond without interfering with the operation of the mechanism. Counterweight 83 is preferably cut out as at 86 to avoid interference with strap 73.

It thus will be seen that rocker 65 is connected with aneroid head 33 through the medium of tension strap 73 and that accordingly rocking motion of the rocker may be effectuated by shift of the aneroid head pursuant to change in atmospheric pressure effecting the present device, with a return spring 87 urging shift of the rocker.

Figure 2:
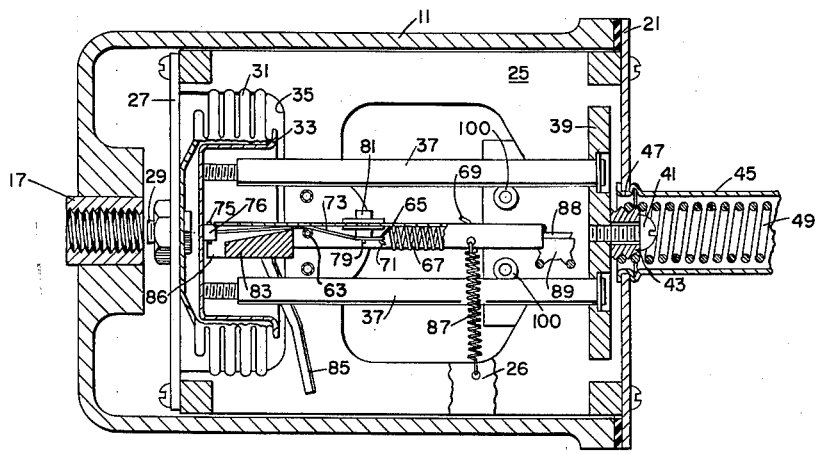
FIG. 2 is a fragmentary view on an enlarged scale, partly in vertical section and partly in elevation, further illustrating details of the device.
Figure 3:
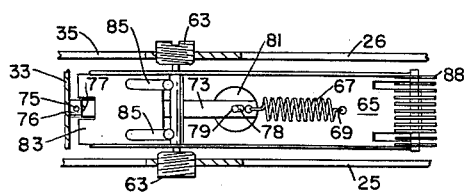
FIG. 3 is a fragmentary inverted plan view illustrating the arrangement of the rocker element of the device.
Figure 6:
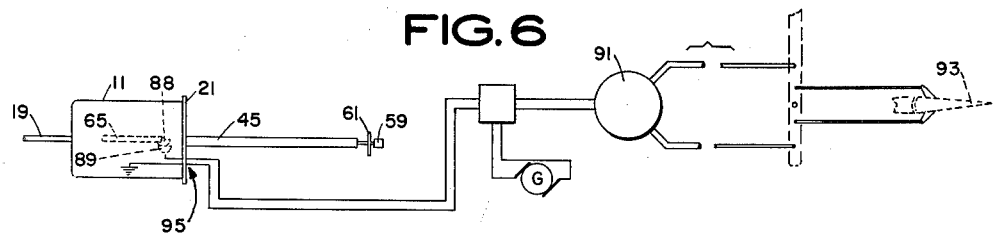
FIG. 6 is a diagrammatic view illustrating the device as shown in FIG. 2.
Figure 7:
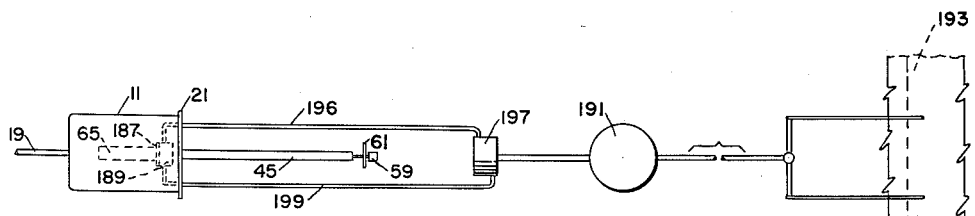
FIG. 7 is a diagrammatic view illustrating the device as shown in FIG. 4.
Figure 5:
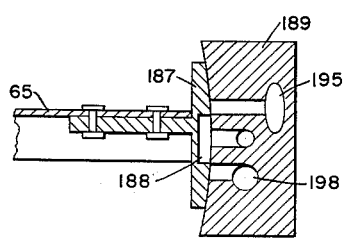
FIG. 5 is a further enlarged fragmentary sectional view illustrating the air valve sensing element.

In one embodiment of the invention, as shown in FIG. 2, and schematically diagrammed in FIG. 6, the rearward end of rocker 65 is equipped with the shiftable part 88 of a variable condenser unit, a fixed part 89 being carried by chassis plates 25, 26. The condenser 88, 89 is connected suitably to a servo unit 91 which is coupled in conventional fashion as to an aircraft control 93. It will be observed that the connection from condenser 88, 89 is a jack-like connector 95, which, as indicated in FIG. 6, is grounded to the chassis 23.

Figure 4:
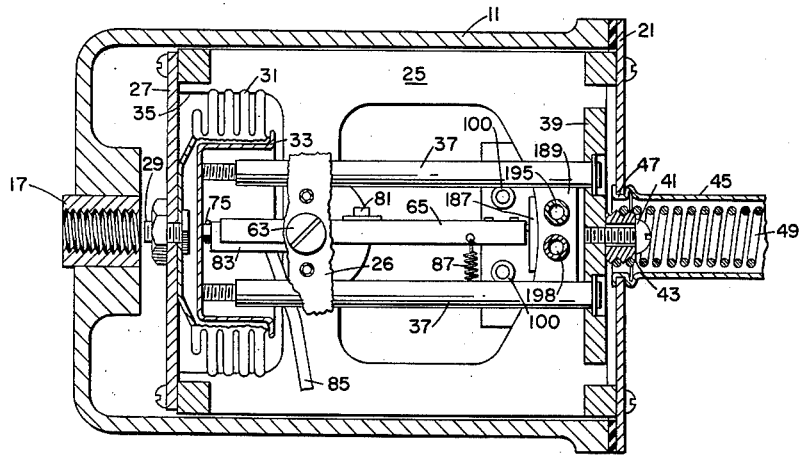
FIG. 4 is a view similar to FIG. 2 illustrating another form of the invention.

In the other form of the invention, as shown in FIG. 4, a shiftable block 187 is mounted upon rocker 65, block 187 being provided with a central opening 188 which is adapted upon shift of block 187 to effect respective communication with airpassageways 189, the passageways being respectively connected to an air operated servo unit 191 which is conventionally connected to an aircraft control 193. Thus the air connection may be from a passageway 195 in valve 189 through a pipe 196 to an air control unit 197 and thence to servo 191, or from a passageway 198 through a pipe 199 to control unit 197 and thence to the servo.

In the use and operation of the device after its suitable installation in an aircraft, the tension on spring 49 is adjusted to balance the aneroid head 33 to the desired setting for surrounding atmospheric pressure, disposing rocker 65 in balanced condition between and spaced from stops 100. With the unit thus set, the device is sensitive to variations in altitude of the aircraft in which the device is mounted and serves to return the aircraft to the desired and preselected altitude through the action of the aneroid head seeking to balance with the surrounding atmosphere.

When the head 33 is balanced with the surrounding atmosphere, tension spring 67 urges and effects movement of tension strap 73 away from aneroid head 33 until the forward ends of the respective slots 77, 78 in tension strap 73 come into engagement with the attachment pins 75, 79, respectively. This accordingly stops relative movement between aneroid head 33 and rocker 65.

Return spring 87, which is connected to rocker 65, and which also, as shown in FIG. 2, is connected to chassis plate 26, urges downward movement of the rear end of rocker 65 and urges the maintenance of the tension strap slots against their respective pins. In the event of a movement of aneroid head 33 toward the rocker, which will occur when the setting of the device is for an altitude below the existing altitude of the aircraft, the movement of the aneroid head moves the pins 75, 79 away from their engagement with the forward ends of the tension strap slots, and immediately the urging of spring 87 causes downward rocking of the rearward end of rocker 65.

It will be observed that the rearward movement of the aneroid head toward the rocker must first take up the lost motion travel of pin 75 in slot 77, enabling tension spring 67 correspondingly to move the tension strap and preventing buckling of the tension strap under such shift of the aneroid head. The rearward movement of the aneroid head can only continue until bridge 39 comes into engagement with the forward end of tube 45 adjacent plate 21.

If the device is set for an altitude above the existing altitude of the aircraft, aneroid head 33 moves forwardly away from rocker 65, shifting pin 75 forwardly along slot 77, and then transmitting the tension thus exerted on strap 73 through the forward shift of slot 78 relative to pin 79, this movement being resisted by tension spring 67, thus yieldingly effecting an upward shift of the rearward end of rocker 65, while cushioning against and preventing destructive loading on the pivot bearings of the rocker or on the other interconnections of the parts.

It thus will be seen that the present device includes safety features substantially preventing injury to or destruction of the delicate mechanisms involved, and thus provides an altitude sensitive device which may be drastically changed in adjustment, as for example by a marked change in altitude setting while aloft, without danger of damage to the instrumentation. It will be readily apparent that the rocking movement of rocker 65 effecting relative shift of the sensing element (whether condenser or air valve) carried by the rocker elements is efficiently adapted to transmit the changes of position of the aneroid head responsive to changes of atmospheric pressure to the controls of the aircraft for correspondingly adjusting the controls so as to modify the altitude position of the aircraft.

Although the present device involves mechanisms of a sensitive nature it is compactly arranged and sturdily constructed so as to minimize and substantially eliminate impeding forces and factors and thus to tend to insure the full and proper operation of the device.

It is to be observed that the prongs 85 of counterweight 83 extend a substantial distance outwardly from the aneroid head 33 and away from rocker 65. These prongs 85 have the additional effect of assisting in maintaining the proper balance of the rocker element relative to the aneroid head even during accentuated attitude of the flight of the aircraft in which the device is mounted. Thus for example, if the aircraft is caused to go into a severe diving attitude the weight of adjustment spring 49, of bridge 39, as well as of tension rods 37 would tend to exert under the influence of gravity a force upon the aneroid head 33 which would tend to move the head away from rocker 65 and cause undesired rocking shift of the rocker. The provision of the prongs 85 upon the counterweight are also acted upon by gravitational influence but exerting an opposite influence upon the rocker and tending to maintain stabilized condition of the rocker even in such accentuated attitude of flight. Similarly, the prongs have their effect in the event the aircraft is caused to go into a severely climbing attitude.

I claim:

1. In an aircraft control system, altitude sensing means comprising a pressure shiftable aneroid device which includes a recessed aneroid head adjacent the front, a chassis mounting said device, elongated adjustment means connected to and extending rearwardly from said head for adjusting the relative position of said head, a rocker, pivot means rockably supporting said rocker in said device; means coupling said rocker to said head including a tension strap having elongated slots adjacent its ends, pin means loosely extending through one of said slots and forming a lost motion connection to said head, additional pin means carried by said rocker and extending through the other said slot and forming a lost motion connection between said rocker and said strap, a tension spring connected between said rocker and said strap adjacent said latter slot urging shift of said strap away from said head, return spring means connecting said rocker to said chassis rearwardly of said rocker and urging downward rocking movement, and a sensing element carried on the rear end of said rocker oppositely adjusted by rocking shift of said rocker under the influence of pressure changes imparted to said head and transmitted to said rocker.

2. A device in accordance with claim 1, in which said sensing element is a variable condenser.

3. A device in accordance with claim 1, in which said sensing element is a shiftable air valve.

4. A device in accordance with claim 1, in which said strap is passed above said pivot means and below said rocker intermediate its said slots.

5. A device in accordance with claim 1, in which said rocker is pivoted to overbalance rearwardly and is provided at its forward end with a counterbalance weight.

6. A device in accordance with claim 1, in which said rocker and said counterweight extend into the recess in said bead.

7. A device in accordance with claim 1, in which the adjustment means are attached to a bridge member at the rear of the device, a pair of rods extend forwardly therefrom into connection with said head within its recess, and said rods are positioned above and below said rocker.

8. In an aircraft which includes controls for adjusting the altitude of the aircraft, a control system mounted in said aircraft, comprising altitude sensing means having a chassis, a flexible sealed chamber mounted on said chassis, said chamber being respectively collapsingly and expandingly responsive to fluid pressure changes external to said chamber and having a pressure internal of said chamber less than atmospheric pressure, a head forming part of said chamber longitudinally shiftable respectively in opposite directions under said external fluid pressure changes, adjustable tension means attached to said head and mounted on said chassis establishing resistance of said chamber to external fluid pressure, a sensing element movably mounted on said chassis, means connecting said head to said sensing element for moving said element responsive to shift of said head, means coupling said sensing element to said controls for adjusting said controls responsive to changes in fluid pressure external to said chamber, and stop means limiting travel of said head and means limiting movement of said sensing element, said means connecting said head to said sensing element including a lost motion connection for protecting said sensing element.

9. A system in accordance with claim 8, in which said lost motion connection comprises an elongated longitudinally extending slot in said connecting means, a pin slidable in said slot means connecting said pin to said sensing element, and resilient means interconnecting said sensing element and said connecting means.

References Cited in the file of this patent

UNITED STATES PATENTS

| | | |
|---|---|---|
| 2,034,909 | Kollsman | Mar. 24, 1936 |
| 2,415,092 | Frische et al. | Feb. 4, 1947 |
| 2,441,882 | Hicks | May 18, 1948 |
| 2,445,335 | Philbrick et al. | July 20, 1948 |
| 2,563,405 | Germaix | Aug. 7, 1951 |
| 2,805,682 | Panich | Sept. 10, 1957 |